Patented Sept. 15, 1925.

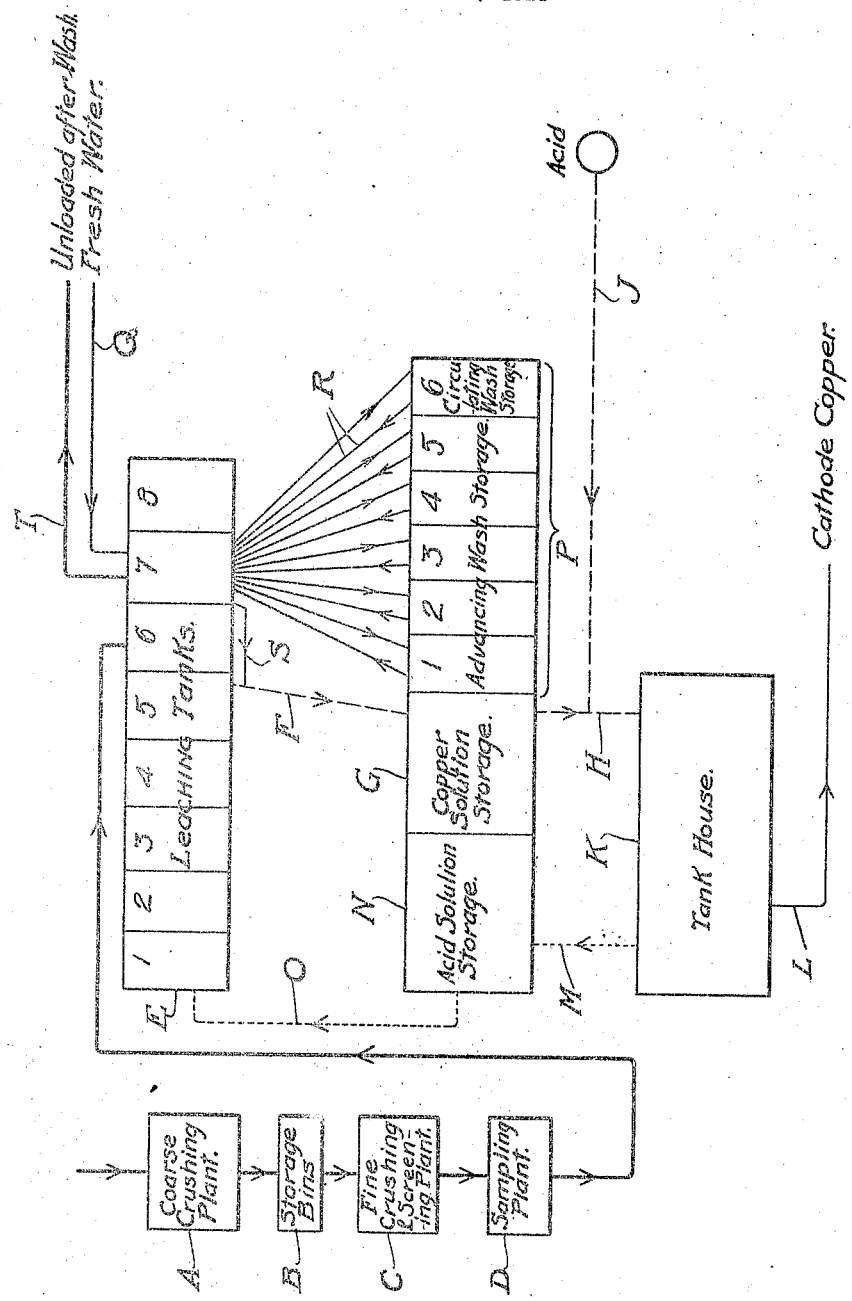

1,553,414

UNITED STATES PATENT OFFICE.

GEORGE D. VAN ARSDALE, OF LOS ANGELES, CALIFORNIA, ASSIGNOR TO INSPIRATION CONSOLIDATED COPPER COMPANY, OF NEW YORK, N. Y., A CORPORATION OF MAINE.

METHOD OF LEACHING SULPHIDE AND MIXED ORES.

Application filed May 18, 1923. Serial No. 639,969.

*To all whom it may concern:*

Be it known that I, GEORGE D. VAN ARSDALE, a citizen of the United States, residing at Los Angeles, in the county of Los Angeles and State of California, have invented new and useful Improvements in Methods of Leaching Sulphide and Mixed Ores, of which the following is a specification.

My present invention relates to a method of leaching sulphide and mixed ores; and the discoveries described in this specification imply an improved method of extracting copper from sulphide or mixed ores, the primary objects of my improvements being a diminution of costs and a greater completeness of recovery from ores of the type mentioned. It will be understood by those skilled in the art that by "sulphide" ores are meant those ores in which practically all of the copper occurs in the sulphide form; and by "mixed" ores are meant those ores in which a part of the copper occurs in the sulphide form and a further part occurs in forms soluble in dilute sulphuric acid, or as metallic copper, and commonly known as "oxidized" copper compounds.

The recovery of copper from sulphide ores has heretofore been done largely by concentration methods, including flotation; but the application of concentration methods to some ores has not given entirely satisfactory results, due to the fact that some ores do not give a complete extraction, even when all their copper occurs in the sulphide form. One of the main factors in this unfavorable result is the fact that certain gangue constituents have a very unfavorable effect upon flotation; and, thus far, there has been no fully satisfactory way of overcoming this bad effect. Ores exhibiting the unfavorable tendency referred to are frequently described as having "colloid" gangue constituents, and heretofore such ores have been treated by mixing them with ores not having such constituents; but the result of this expedient cannot be considered satisfactory, since the described objectionable constituents still have an effect, although this is obscured by the dilution. It is accordingly one specific object of my present invention to overcome certain disadvantages and to obviate certain losses which have heretofore been due either to the presence of objectionable constituents in certain sulphide copper ores or to other reasons for low recoveries; and to this end I prefer to employ a direct leaching treatment followed by an electrolytic treatment, these respective treatments being so regulated and so correlated as to render them mutually supplementary, as hereinafter described.

It is a further object of my invention to justify and render commercially practicable the large-scale working of certain known bodies of mixed ores of copper for which no satisfactory treatments have heretofore been devised.

Numerous attempts have been made to devise and apply treatments adapted to a full recovery of values from mixed ores containing the so-called oxidized compounds; but it is believed that none of these is in extensive use, although the problem of their utilization is an extremely important one in many places, by reason of the large amounts of such ores that are easily available. Most of the proposed methods for treatment of such ores employ a combination of two different treatments for extracting the oxids and sulphides respectively. A considerable commercial disadvantage of some of the proposed methods for treating mixed ores of copper arises from the fact that, while these may be scientifically practicable, the amounts of the two classes of copper compounds present in these ores may be, and usually are, quite variable, the percentages either of oxid copper, or of sulphide copper, being sometimes close to the limit at which it is commercially profitable to extract such compounds alone by the application of direct methods.

While the tailings from the concentration of such ores may carry so much copper as to indicate an inefficient recovery, the ores may nevertheless not carry enough acid-soluble compounds to render their recovery by known straight leaching methods commercially practicable. For this reason, a method involving only "wet" and electrolytic steps, and capable of obtaining values from both the oxid and the sulphide compounds by one course of operations, is decidedly preferably, in many cases, as compared with separate methods for each class of compounds, even at an equal cost. It is an important object of my invention to provide a commercially practicable single extraction treatment for mixed ores of the character referred to.

As a concrete example of the application of my discoveries in a process of treating mixed copper ores, I may refer to the treatment of a body of dry-crushed ore adapted to pass through a ¼ inch mesh or less. In this connection, I may state that suitable crushing is highly important to the best success of my process, and may contribute not only to a completeness of recovery but to obviate the necessity for the application of heat during leaching and to shorten the period thereof. The extent to which completeness of recovery is influenced by fineness of crushing may be inferred from the fact that an ore crushed to pass a ½ inch mesh has been found to yield, under the treatment hereinafter described, tailings containing about .5% copper, whereas the same ore when crushed to pass a ¼ inch mesh has yielded, under identical treatment, tailings containing about .31% copper, and when crushed to pass a 1/16 inch mesh only .2% copper, or less, in the tailings. In some cases, even finer crushing may be employed to advantage to permit access of solutions to the copper minerals.

Broadly, the process to which I subject successive bodies of dry-crushed ores involved a percolation method of extraction so correlated with a method of electrodeposition that the electrodeposition yields, as an incidental product, an acid solution of a ferric sulphate suitable for use, with or without the addition of acid, in the extraction of a further quantity of crushed ore, my process being in this sense cyclical, and the practicability of this procedure depending in part upon the practical limit of tolerance of an iron sulphate present during electrolysis and during extraction.

Without roasting, I prefer to treat a body of suitably crushed ore to an extraction in an aqueous solvent containing, in addition to about 5% sulphuric acid, 1% or more of iron in the form of ferric sulphate, and copper in the form of copper sulphate, which may be present in any convenient or desirable percentage, say, from 2.5% to 4.5%. It will be understood that the oxid constituents of the ore are directly attacked by the sulphuric acid or by the combined action of the acid and ferric iron.

The reactions and methods by which the oxid constituents are dissolved, as above indicated, do not materially differ from known leaching practice on these constituents; but it has not heretofore been regarded as practicable to remove both oxid and sulphide compounds by one leaching operation.

It has been known that sulphide compounds of copper are amenable to the solvent action of ferric salts under certain conditions. The following equation is an example of such action:

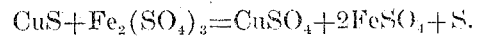

$$CuS + Fe_2(SO_4)_3 = CuSO_4 + 2FeSO_4 + S.$$

It has also been known that the solution produced by the above equation may be treated by electrolysis so as to regenerate the solvent. Other methods of regenerating ferric iron has been proposed, but have heretofore not proven practicable.

There have, however, been obstacles, aside from the above mentioned necessity for fine crushing, in the way of a practical application of the above simple method of leaching sulphur compounds of copper with ferric iron and subsequently regenerating by electrolysis. Up to the present time, electrolysis of copper sulphate solutions carrying iron has not been found practicable when so much iron is present that the strength of ferric iron incidentally produced during electrolysis rises to a figure in the neighborhood of .3% to .5%; say about .4%.

In further explanation, it may be stated that solutions carrying only .3% to .5% ferric iron are inactive on some sulphide compounds of copper; and, on others, the action is slow and may even require heating. With solutions containing larger amounts of ferric iron, say from .5% to 1% or more, I have discovered that the solvent action is much more active and rapid, and on some ores the necessity for warming the solutions is thus obviated,—with substantial advantages, from the standpoint of economy. It will be understood from the foregoing that in the employment of ferric sulphate leaching solutions, starting with, say 1% ferric iron, complete reduction of ferric iron before electrolysis cannot be had economically from the standpoint of leaching efficiency,— although this complete reduction has heretofore been regarded as essential to good electrolytic practice.

Now I have discovered that by modifying electrolytic conditions, electrolysis can be carried on, with commercial yields of copper, in the presence of very much higher amounts of ferric iron than have heretofore been thought permissible, and even in the presence of an amount sufficiently high to give a highly active solvent percentage of ferric iron. I, therefore, prefer to utilize conjointly my respective discoveries that such solutions are highly active solvents, and that it is practicable to make them by electrolysis; and, to do this, I prefer to leach the ore in such manner as not to obtain a complete reduction of the ferric iron present, aiming rather to so proportion ore and solvent that a good extraction shall take place while the per cent of ferric iron present is still high enough to act vigorously. This point will, of course, vary with different ores and conditions; but, in general, I have found it not necessary to reduce ferric iron below about .2%, and, in some cases, not below .5%. Generally speaking, on most ores, a maximum strength of 1% of ferric iron is sufficient; but higher percentages may be used, if necessary. A preferred method by which high percentages of ferric iron may be made by electrolysis is referred to subsequently herein.

When practicable, I prefer, as indicated, to treat ores by percolation; but it is not essential to the carrying out of my process. Agitation of crushed ore suspended in the solutions, followed by continuous countercurrent decantation and washing, might obviously be used; and this procedure would be entirely appropriate to, for example, the recovery of values from tailings after a concentration treatment of ores.

The duration of the percolation treatment of a given body of mixed ore will vary with the character of the ore and may be from four to twelve days. The use of the described relatively high content of ferric iron in the leach liquor makes possible the shortening of time of treatment and increased extraction even without the application of heat. Some application of heat during the final portion of the period of extraction may, however, be economically justified for some ores. As is now customary in operations of this character, the countercurrent principle is preferably employed throughout the leaching; and, whenever such a course shall be indicated by a comparison of the copper content of the ore with the titre of the regenerated solvent resulting from electrolysis, as hereinafter described, suitable additions of acid may be made to the leach liquor; but otherwise it is of importance that the volume of the successive portions of wash or leach liquor be so controlled as not materially to change the total volume of solution. This can be done by well known methods, provided there is no excess or deficiency of solution constituents. With a building up of any metal, e. g., iron, in solution, a proportional discard for special treatment is required, or other method, e. g., the one hereafter described may be used.

When the application thereof to successive portions of ore undergoing extraction shall have produced a liquor sufficiently rich in copper content and tailings which cannot profitably be further treated, the latter, separated by filtration or otherwise, may be discarded after washing, and the liquor may be added to a main body of liquor to undergo any appropriate treatment; but I prefer to subject the same to an electrolysis in the manner which I will hereinafter describe.

When mixed ores contain considerable quantities of soluble iron, the control of this element in cyclical processes which involve a regeneration and reuse of the leach liquor is often a matter of great practical importance, both with respect to the total amount present and with respect to the balance of ferrous and ferric iron in succeeding cycles; and while my preferred method of controlling the iron content involves features of novelty which are separately claimed in a copending application (Ser. No. 639,970 filed May 18, 1923), I outline herein one of these methods merely for purposes of completeness, and in order that the cyclical character and practical advantages of the method herein described and claimed may be better understood. In this connection, as stated, an excess of the total iron may be compensated by a solution discard. A neutralizing accompanied by a heating has also heretofore been used to eliminate iron from liquors obtained by the leaching of mixed ores of copper; but the neutralization referred to involves acid loss and is expensive. I have found, when the accumulation of iron in a leach liquor cyclically used is comparatively rapid, such iron may, if desired, be eliminated by a precipitation effected, without neutralization, by a mere application of suitable pressure to the liquors while the same are heated; and this may advantageously be done before the leach liquors are subjected to electrolysis, any suitable apparatus being employed. In addition to cases requiring these expedients, which are for the purpose of controlling excess of total iron, there may arise cases in which the ferrous and ferric iron may not balance as required in successive cycles, and in order to meet, for example, the case in which the reducing power of the ore is such as would otherwise result in an accumulation of ferric iron, I may use in conjunction, during my electrolysis, a suitable proportion of anodes, such as graphite anodes, which are relatively efficient in the regeneration of ferric sulphate from ferrous sulphate, together with a suitable proportion of other anodes having a lower efficiency in this direction—such as anodes of lead,—the ratio of these two types of anodes being so adjusted as to keep the ferric iron in balance during successive cycles.

As indicated above, a very important practical feature of my invention is the method of electrolysis by which I may produce or regenerate larger amounts of ferric iron than have hitherto been thought possible at any reasonable cathode efficiency. The presence of ferric iron during electrolysis of copper solutions has been considered highly objectionable, and objectionable in proportion to the amount of ferric iron present. This view has apparently been due to an appreciation of the fact that ferric iron is an efficient solvent for metallic copper; and unless means are taken to counteract the mentioned tendency to solution, the cathode efficiency is correspondingly reduced. Statements are found in the literature to the effect that at about .5% of ferric iron, deposition efficiency becomes very low; and, as a practical proposition, at one large installation using electrolysis, maximum ferric iron is held near .4%. Contrary to the prevalent opinion, I have, however, found that commercial yields of copper per kilowatt hour may be had with solutions beginning at about a zero content of ferric iron and ending at about 1%, or even more. That is to say, within the mentioned limits, the actual percentage of ferric iron may be disregarded,—although, obviously, the overall efficiency, for a given amount of copper deposit, will vary with the point at which ferric iron starts in beginning electrolysis. In order, therefore, to maintain any constant deposition efficiency, the amount of copper deposited must vary inversely with the average percentage of ferric iron before and after electrolysis.

In operating with a higher average of ferric iron, therefor, the solutions have to be returned more frequently in order to leach the copper from any given quantity of ore. This is done at an expense of pumping cost, but it may nevertheless be entirely justified in view of the fact that, as stated, high ferric iron is very desirable from the standpoint of leaching efficiency.

In order to obtain commercial cathode efficiency during electrodeposition of copper, I have found it advantageous to employ a current density of at least seven to eight amperes per square foot, and the current density may be raised to fifteen amperes or more per square foot; and I have found that, by suitably proportioning current density to ferric iron, the latter may be disregarded. To obtain commercially profitable yields, as measured in terms of pounds of copper per kilowatt hour, it is also important that low voltages be employed; and such voltages may be obtained by a moderate heating (say, to 110 degrees F.) in connection with which it may be advantageous to employ known means for depolarization, and also to employ as large a proportion of graphite anodes as may be consistent with the considerations indicated above.

The preceding specifications contain a full discussion of the methods by which this invention may be applied under various conditions. In order that the process may be clearly understood the following is a specific example of its application. I do not claim the discovery of the solvent action of ferric iron, but only new methods of making and controlling the reagent so that its use is rendered practicable, which has not been the case before. An important Arizona copper deposit has large tonnages of ore carrying about 1.25% total copper, of which so large an amount is in the form of oxide or silicate that the usual methods of concentration do not give high enough recoveries. A combination method of leaching and flotation is possible but may not be commercial for the portions of the ore with too low a proportion of oxide or sulphide. On this ore the method of direct leaching as described has resulted in perfectly satisfactory extractions. For example, the treatment of a large amount averaging 1.40% total copper, .69% oxide copper, and .71% sulphide copper has given tailings containing .199%, .012%, and .187% total oxide and sulphide copper respectively.

The steps by which this result were obtained were as follows: dry crushing to pass a three mesh screen, loading the crushed ore into rectangular leaching tanks, subjecting it therein to contact with leaching solution for 7½ to 10 days, drawing off the main leaching solution and subjecting it to electrolysis after addition of acid, washing the ore by successive unit volume washes of which the strongest is added to the main solution and the others successively advanced for the next cycle, finally washing the ore exhaustively with a circulating wash as described in a separate application (Serial No. 665,463, filed September 28, 1923) and discharging the washed tailings, the operation being then repeated on a fresh charge of ore. The mechanical operations do not differ from standard leaching practice, but the methods of control involving the application of this invention may be understood from the following figures in detail from the above operations.

The main solution to and from the ore averaged as follows: Cu 2.69%, free $H_2SO_4$ 6.18%, total iron 2.3%, ferrous iron 1.15%, ferric iron 1.15%. The main solution from the ore and to electrolysis averaged Cu 3.1%, free $H_2SO_4$ 5.27%, total iron 2.28%, ferrous iron 1.43%, and ferric iron 0.85%. It should be noted that the last percentage of ferric iron is still at a point at which it is an active solvent, and is considerably above the percentage hitherto thought possible as a practicable solution for electrolysis. During the same period, the tank house was operated at a current density averaging 15.28 amperes per square foot, with a cathode efficiency of 65.4%, an anode efficiency of 55.2%, and a yield of .715 pounds copper per kilowatt hour. The reducing character of the ore in this particular case was such that a balance of ferric iron could be maintained with all lead anodes.

The single figure of the drawing is a flow sheet illustrating the present process. The ore is taken first to the coarse crushing plant A, thence to storage bins B, a fine crushing and screening plant C and a sampling plant D; whence it passes to the leaching tanks E. At any stage of the operation there are five of these used in series, the solution passing through one after the other of the series. These are numbered 1, 2, 3, 4, 5, in which the leaching operation is being performed at the period illustrated; number 6, which is being loaded and numbers 7 and 8 which are used in the washing operation. The copper solution from the series 1 to 5 flows by way of the line F to the copper solution storage tank G, thence by the line H, along which it is reinforced by acid along the line J, and finally to the tank house K where the electrolytic process is carried out. The cathode copper is taken off by the line L. The acid solution is taken off from the tank house through the line M and the acid solution storage tank N whence it passes by the line O to the leaching tanks.

In my co-pending application Serial No. 665,463, filed September 28, 1923, I have described a method of washing the residue of the ore after leaching, and this is illustrated in part here, though not claimed in the present application. A series of tanks for storing the advancing wash water is illustrated at P numbered 1, 2, 3, 4, 5, 6 respectively. The leaching tank 7 carries the residue which is being subjected to the washing operation. The fresh water enters the tank by the line Q. After passing through the material the water passes by lines R to and from wash storage tank 6; thence back to the tank 7, through the material therein and to and from wash storage tank 5; and so on through the several wash storage tanks. The last and strongest wash water then passes by the line S into the line F carrying the copper solution from the tanks which are employed for the leaching. The washed residue is carried off by the line T. It will be understood that the eight leaching tanks shown are used in succession. For example, after working as described for a certain period of time, the connections will be changed so as to use numbers 2, 3, 4, 5 and 6 as the series of leaching tanks; number 7 as the tank which receives the fresh ore and number 8 as the tank in which the washing takes place; shifting in the same way to use all the tanks in succession for loading, leaching and washing.

The method of this invention is applicable with advantage not only to ores but also to concentrates, and the term "ores" as used therein will be understood as including concentrates.

It will be understood by those skilled in the art that various features of the process herein described may be independently used, and that various modifications of my preferred process will be found possible without departure from the spirit and scope of my invention as the same is indicated above and in the following claims.

What I claim is:

1. A method of treating mixed ores of copper, which comprises dry-crushing unroasted mixed ores to a size sufficient to permit access of solutions to the copper minerals and thereafter subjecting the same to a leaching with an acid solution containing about .4% to 1% or more of ferric iron.

2. A method of treating mixed ores of copper, which comprises dry-crushing unroasted mixed ores to a suitable fineness and thereafter subjecting the same to a leaching with an acid solution containing about .4% to 1% or more of ferric iron, the said solution being at first employed cold.

3. A method of treating mixed ores of copper, which comprises dry-crushing unroasted mixed ores to a suitable fineness and thereafter subjecting the same to a leaching with an acid solution containing about .4% to 1% or more of ferric iron, the resulting rich liquor being thereafter subjected to an electrolysis adapted to the deposition of copper and the simultaneous regeneration of a leach liquor of substantially the character previously employed.

4. A method of treating mixed ores of copper, which comprises dry-crushing unroasted mixed ores to a suitable fineness and thereafter subjecting the same to a leaching with an acid solution containing about .4% to 1% or more of ferric iron, the resulting rich liquor being thereafter subjected to an electrolysis adapted to the deposition of copper and the simultaneous regeneration of a leach liquor of substantially the character previously employed, the amount of ferric iron being controlled by the employment, during electrolysis, of a suitable proportion of electrodes of high and of low efficiency in the regeneration of ferric iron.

5. A method of treating mixed ores of copper, which comprises dry-crushing such ores to a suitable size, thereafter subjecting the crushed product to a leaching by means of an acid solution containing about .4% to 1% or more of ferric iron, the solution being at first employed cold and subsequently heated only as satisfactory extraction may require.

6. A method of treating mixed ores of copper, which comprises dry-crushing such ores to a suitable size, thereafter subjecting the crushed product to a leaching by means of an acid solution containing ferric iron, the solution being at first employed cold and subsequently heated only as satisfactory extraction may require, subjecting the resultant rich liquor to electrolysis, and so controlling the content of iron as to restrict the percentage of ferric iron in the regenerated liquor to a quantity suitable for use in subsequent extraction.

7. In a cyclical process for the recovery of values from material containing sulphides of copper, the step which consists in leaching such materials with a solution containing a determined percentage of ferric sulphate sufficient to assure a high efficiency of extraction and without permitting the content of ferric iron in the leach liquor to fall below a figure suitable to such extraction, no effort being made to avoid the presence of ferric iron in the resulting rich liquor.

8. In a cyclical process for the recovery of values from material containing sulphides of copper, the step which consists in leaching such material with a solution containing sufficient ferric sulphate to assure a high efficiency of extraction, and without permitting the ferric iron content of the leach liquor to fall below about .4% to 1%.

9. In a cyclical process for the recovery of values from material containing sulphides of copper, the step which consists in leaching such material with a solution containing sufficient ferric sulphate to assure a high efficiency of extraction, and without permitting the ferric iron content of the leach liquor to fall below a figure suitable to such efficient extraction, and thereafter plating out copper while tolerating the presence of ferric iron in percentages suitable to the mentioned high efficiency during the subsequent re-use of the regenerated leach liquor.

10. In a cyclical process for the recovery of values from material containing sulphides of copper, the step which consists in plating out copper by electrolysis while tolerating the presence of ferric iron in percentages suitable to a high efficiency in the subsequent use of the regenerated electrolyte as a leach liquor.

11. In a cyclical process for the recovery of values from material containing sulphides of copper, the step which consists in plating out copper by electrolysis while tolerating the presence of ferric iron in percentages up to about 1%, or more.

12. In a cyclical process for the recovery of values from material containing sulphides of copper, the steps which consist in leaching such materials with an acid leach liquor containing ferric iron and without permitting the content of ferric iron therein to fall below a figure suitable to efficient extraction and thereafter plating out copper while tolerating ferric iron in percentages suitable to subsequent efficient extraction, said extractions being conducted on the countercurrent principle.

13. In a cyclical process for the recovery of values from material containing sulphides of copper, the steps which consist in leaching such materials with an acid leach liquor containing ferric iron and without permitting the content of ferric iron therein to fall below a figure suitable to efficient extraction and thereafter plating out copper while tolerating ferric iron in percentages suitable to subsequent efficient extraction, said extractions being conducted on the countercurrent principle and with any requisite addition of acid.

14. In the recovery of copper from materials containing the same in sulphide form by a cyclical process involving an extraction which tends to convert ferric iron into ferrous iron and an electrodeposition which tends to convert ferrous iron to ferric iron, the method which consists in maintaining the ferric content throughout at a level determined by the efficiency of extraction.

15. In the recovery of copper from materials containing the same in sulphide form by a cyclical process involving an extraction which tends to convert ferric iron into ferrous iron and an electrodeposition which tends to convert ferrous iron to ferric iron, the method which consists in maintaining the ferric content throughout at a level determined by the efficiency of extraction, up to 1% or more of ferric iron being tolerated during the electrodeposition of copper.

16. In the recovery of copper from materials containing the same in sulphide form by a cyclical process involving an extraction which tends to convert ferric iron into ferrous iron and an electrodeposition which tends to convert ferrous iron to ferric iron, the method which consists in maintaining the ferric content throughout at a level determined by the efficiency of extraction, up to 1% or more of ferric iron being tolerated during the electrodeposition of copper, said electrodeposition being conducted at an elevated temperature.

17. In the recovery of copper from materials containing the same in sulphide form by a cyclical process involving an extraction which tends to convert ferric iron into ferrous iron and an electrodeposition which tends to convert ferrous iron to ferric iron, the method which consists in maintaining the ferric content throughout at a level determined by the efficiency of extraction, up to 1% or more of ferric iron being tolerated during the electrodeposition of copper, said electrodeposition being conducted with a high current density.

18. In the recovery of copper from materials containing the same in sulphide form by a cyclical process involving an extraction which tends to convert ferric iron into ferrous iron and an electrodeposition which tends to convert ferrous iron to ferric iron, the method which consists in maintaining the ferric content throughout at a level determined by the efficiency of extraction, up to 1% or more of ferric iron being tolerated during the electrodeposition of copper, said electrodeposition being conducted with the use of a large percentage of carbon anodes.

19. In the recovery of copper from materials containing the same in sulphide form by a cyclical process involving an extraction which tends to convert ferric iron into ferrous iron and an electrodeposition which tends to convert ferrous iron to ferric iron, the method which consists in maintaining the ferric content throughout at a level determined by the efficiency of extraction, up to 1% or more of ferric iron being tolerated during the electrodeposition of copper, said electrodeposition being conducted under conditions of current density permitting the percentage of ferric iron present to be disregarded.

20. In the recovery of copper from materials containing the same in sulphide form by a cyclical process which tends to convert ferric iron into ferrous iron and an electrodeposition which tends to convert ferrous iron into ferric iron, the method which involves maintaining the ferric content throughout at a level determined by efficiency of extraction, and returning the liquor from the electrolytic tanks to the extraction tanks as often as may be required to maintain the mentioned level.

21. In the recovery of copper from materials containing the same in sulphide form by a cyclical process which tends to convert ferric iron into ferrous iron and an electrodeposition which tends to convert ferrous iron into ferric iron, the method which involves maintaining the ferric content throughout at a level determined by efficiency of extraction, and returning the liquor from the electrolytic tanks to the extraction tanks as often as may be required to maintain the mentioned level, the conditions of electrodeposition being such that the percentage of ferric iron present during the deposition of copper may be disregarded.

22. A cyclical process of treating mixed ores of copper, which comprises treating the same with an acid solution of ferric iron containing total iron only in quantities suitable, upon conversion into a ferric form, for a maximum leaching efficiency, and not in excess of the quantity tolerable during electrolysis.

23. A cyclical process of treating mixed ores of copper, which comprises treating the same with an acid solution of ferric iron containing total iron only in quantities suitable, upon conversion into a ferric form, for a maximum leaching efficiency, and not in excess of the quantity tolerable during electrolysis, said extraction being begun without application of heat.

24. A cyclical process of treating mixed ores of copper, which comprises treating the same with an acid solution of ferric iron containing total iron only in quantities suitable, upon conversion into a ferric form, for a maximum leaching efficiency, and not in excess of the quantity tolerable during electrolysis, said extraction being followed by an electrolysis tolerating ferric iron in quantities suitable to a high efficiency during the reuse of the regenerated liquor.

25. The method of treating concentrates yielding liquors containing about 1% or more of ferric iron to obtain copper therefrom, which comprises a leaching without roasting and a subsequent precipitation of copper and regeneration of leach liquor high in iron by electrolysis, the ferric iron content being kept throughout at a level determined by efficiency of extraction.

26. The method of treating concentrates yielding liquors containing about 1% or more of ferric iron to obtain copper therefrom, which comprises a leaching without roasting and a subsequent precipitation of copper and regeneration of leach liquor high in iron by electrolysis, the ferric iron content being kept throughout at a level determined by efficiency of extraction, sufficient ferrous sulphate being present during electrolysis to act as a depolarizer.

27. The method of treating concentrates yielding liquors containing about 1% or more of ferric iron to obtain copper therefrom, which comprises a leaching without roasting and a subsequent precipitation of copper and regeneration of leach liquor high in iron by electrolysis, the ferric iron content being kept throughout at a level determined by efficiency of extraction, a current density of ten or more amperes being employed during electrolysis.

28. The method of treating concentrates yielding liquors containing about 1% or more of ferric iron to obtain copper therefrom, which comprises a leaching without roasting and a subsequent precipitation of copper and regeneration of leach liquor high in iron by electrolysis, the ferric iron content being kept throughout at a level determined by efficiency of extraction, said extraction being at first conducted without application of heat.

29. A method of treating ores of copper which comprises subjecting the same to a leaching operation with an acid solution containing about .2% to 1% or more of ferric iron and subjecting the resulting rich liquor to electrolysis to deposit the copper therefrom and to simultaneously regenerate a leach liquor of substantially the character previously employed.

30. The method of treating ores of copper which consists in subjecting the same to a leaching operation with an acid solution containing a determined substantial percentage of ferric iron and subjecting the resulting rich liquor to electrolysis to deposit the copper therefrom and to regenerate a leach liquor containing the said determined percentage of ferric iron.

In testimony whereof I have signed my name to this specification.

GEORGE D. VAN ARSDALE.